(12) United States Patent
Voisine (10) Patent No.: US 10,487,878 B2
(45) Date of Patent: Nov. 26, 2019

(54) MULTIPLE STAGE SEAL FOR A BEARING ASSEMBLY

(71) Applicant: ROLLER BEARING COMPANY OF AMERICA, INC., Oxford, CT (US)

(72) Inventor: James Voisine, Burlington, CT (US)

(73) Assignee: Roller Bearing Company of America, Inc., Oxford, CT (US)

(*) Notice: Subject to any disclaimer, the term of this patent is extended or adjusted under 35 U.S.C. 154(b) by 0 days.

(21) Appl. No.: 15/634,186

(22) Filed: Jun. 27, 2017

(65) Prior Publication Data

US 2018/0003234 A1   Jan. 4, 2018

Related U.S. Application Data

(60) Provisional application No. 62/357,482, filed on Jul. 1, 2016.

(51) Int. Cl.
| | |
|---|---|
| *F16C 33/74* | (2006.01) |
| *F16J 15/32* | (2016.01) |
| *F16C 23/04* | (2006.01) |
| *F16J 15/3232* | (2016.01) |

(52) U.S. Cl.
CPC ........... *F16C 33/74* (2013.01); *F16C 23/043* (2013.01); *F16C 23/045* (2013.01); *F16C 33/743* (2013.01); *F16J 15/3232* (2013.01)

(58) Field of Classification Search
CPC ...... F16C 33/74; F16C 33/743; F16C 23/043; F16C 23/045; F16C 33/805; F16C 33/7896; F16C 11/0666; F16J 15/3232
See application file for complete search history.

(56) References Cited

U.S. PATENT DOCUMENTS

| | | | |
|---|---|---|---|
| 3,848,938 A | 11/1974 | Stella et al. | |
| 4,304,412 A | 12/1981 | Ladin | |
| 4,768,889 A * | 9/1988 | Loser ................. | F16C 33/74 |
| | | | 384/145 |
| 4,819,854 A | 4/1989 | Schmehr | |
| 5,414,316 A | 5/1995 | Michel et al. | |
| 7,891,878 B2 | 2/2011 | Peschke et al. | |
| 9,157,480 B2 | 10/2015 | Voisine | |

(Continued)

FOREIGN PATENT DOCUMENTS

| | | |
|---|---|---|
| CN | 102046991 A | 5/2011 |
| DE | 29900907 U1 | 4/1999 |

(Continued)

OTHER PUBLICATIONS

European search report for corresponding application EP17178646 dated Aug. 9, 2017.

*Primary Examiner* — Alan B Waits
(74) *Attorney, Agent, or Firm* — Murtha Cullina LLP (57) ABSTRACT

A flexible double lipped annular seal includes an anchor segment at a radially outermost portion thereof and having a pocket formed therein. The annular seal includes a branch segment extending axially outward and radially inward from the first leg at an angle. A first lip seal and a second lip seal extend radially inward from the branch segment and have a gap therebetween. The branch segment terminates in a stub segment. The annular seal includes a metallic shield secured to the annular seal and a portion of which seats in the pocket.

10 Claims, 11 Drawing Sheets

(56) References Cited

U.S. PATENT DOCUMENTS

| | | | |
|---|---|---|---|
| 9,765,822 B2* | 9/2017 | Kanamoto | F16J 15/3276 |
| 2006/0022412 A1 | 2/2006 | Brock et al. | |
| 2010/0327539 A1 | 12/2010 | Okaji et al. | |
| 2013/0192099 A1 | 8/2013 | Gilmore et al. | |
| 2014/0093198 A1 | 4/2014 | Voisine | |
| 2016/0169284 A1* | 6/2016 | Clark | F16C 33/74 |
| | | | 384/137 |

FOREIGN PATENT DOCUMENTS

| | | |
|---|---|---|
| JP | H11218141 A | 8/1999 |
| WO | 2014089434 A1 | 6/2014 |

\* cited by examiner

MULTIPLE STAGE SEAL FOR A BEARING ASSEMBLY

CROSS REFERENCE TO RELATED APPLICATIONS

The instant application claims priority benefit to U.S. Provisional Patent Application No. 62/357,482, entitled "Multiple Stage Seal for a Bearing Assembly" filed on Jul. 1, 2016, which is incorporated by reference in its entirety herein.

TECHNICAL FIELD

The present invention relates generally to seals for bearing assemblies and, in particular, to a seal for spherical plain bearing assemblies to inhibit contamination from entering the bearing raceways. More particularly, the present invention is directed to a sealing arrangement that incorporates two different types of seals, namely, a flexible double lip internal seal with an exterior metallic shield and an external scraper seal that is stiffer than portions of the internal seal.

BACKGROUND

Spherical plain bearing assemblies typically include a ball positioned for rotational movement in an outer race. The ball defines an outer surface, and the outer race defines an inner surface contoured to receive and retain the ball therein such that the outer surface of the ball is in sliding engagement with the inner surface of the outer race. Contamination of the sliding engagement surfaces, namely, the outer surface of the ball and the inner surface of the outer race, is one of the leading causes of bearing damage. Typically, the spherical plain bearing assembly includes a single sealing arrangement on opposing sides thereof, wherein a seal is provided in a single groove for retaining lubrication between the sliding engagement surfaces and for inhibiting the ingress of dirt, water, particulate matter, and other contaminants to the sliding engagement surfaces.

For example, a single spread lock type seal is positioned in each single groove positioned on opposing sides of a spherical bearing, as described in U.S. Pat. No. 6,626,575, the subject matter of which is incorporated herein by reference. Typically, a single groove on each of opposing sides of the spherical bearing was employed to minimize the axial dimensions of the bearing while maximizing the load bearing capability of and sliding engagement between, the outer surface of the ball and the inner surface of the outer race. Thus, use of more than one groove or seal per bearing side was not considered.

In addition, U.S. Pat. No. 9,157,480, the subject matter of which is incorporated herein by reference, discloses a bearing assembly having an external seal positioned in a first annular groove and an internal seal positioned in a second annular groove. The internal seal has an inner lip and an outer lip that are flexibly compressed. The internal seal is stiffer than the external seal, because of the compression.

SUMMARY

In one aspect, the present invention resides in a flexible double lipped annular seal for a bearing assembly, such as a spherical plain bearing. The annular seal includes a first anchor segment that axially extends from a first base of thereof. The first base defines a radially outermost portion of the first anchor segment. A first leg extends radially inward from the first base and a second leg extends radially inward from the first base. The first leg and the second leg are spaced apart from one another and define a pocket therebetween. A branch segment extends axially outward and radially inward from the first leg at a first angle relative to a first axial surface of the first leg. A first lip seal extends radially inward from the branch segment and a second lip seal extends radially inward from the branch segment. The first lip seal and the second lip seal have a gap therebetween. The branch segment terminates in a stub segment. The annular seal has a metallic shield appended there to. The metallic shield has a radially extending second base and a mid-section that extends axially outward and radially inward from the second base at the first angle. The metallic shield has a terminus segment that extends radially inward from the mid-section. The second base of the metallic shield is seated in the pocket. The mid-section is adhered to the branch segment and a portion of the terminus segment is adhered to the stub segment.

In one embodiment, the stub segment is spaced apart from the second lip seal and the terminus segment has a radial end that is positioned radially outward from a distal end of the second lip seal and extends radially inward from the stub segment.

In one embodiment, the stub segment is spaced apart from the branch segment and defines a radially inward extending channel. A distal end of the terminus segment is seated in the channel.

In another aspect, the present invention resides a bearing assembly that includes an inner member that has an outer engagement surface. The bearing assembly includes an outer race that has an inner engagement surface that extends between a first end and a second end thereof. The inner engagement surface is positioned on the outer engagement surface of the inner member and is contoured to a shape complementary to that of the outer engagement surface, such that the outer engagement surface is slidably and rotatably engaged with the inner engagement surface. A first annular groove is formed in the inner surface proximate the first end and/or the second end. The bearing assembly includes a flexible double lipped annular seal. The annular seal includes a first anchor segment that axially extends from a first base of thereof. The first base defines a radially outermost portion of the first anchor segment. A first leg extends radially inward from the first base and a second leg extends radially inward from the first base. The first leg and the second leg are spaced apart from one another and define a pocket therebetween. A branch segment extends axially outward and radially inward from the first leg at a first angle relative to a first axial surface of the first leg. A first lip seal extends radially inward from the branch segment and a second lip seal extends radially inward from the branch segment. The first lip seal and the second lip seal have a gap therebetween. The branch segment terminates in a stub segment. The annular seal has a metallic shield appended there to. The metallic shield has a radially extending second base and a mid-section that extends axially outward and radially inward from the second base at the first angle. The metallic shield has a terminus segment that extends radially inward from the mid-section. The second base of the metallic shield is seated in the pocket. The mid-section is adhered to the branch segment and a portion of the terminus segment is adhered to the stub segment.

In one embodiment, the stub segment is spaced apart from the second lip seal and the terminus segment has a radial end that is positioned radially outward from a distal end of the second lip seal and extends radially inward from the stub segment.

In one embodiment, the stub segment is spaced apart from the branch segment and defines a radially inward extending channel. A distal end of the terminus segment is seated in the channel.

In one embodiment, the bearing includes one or more second annular grooves formed in the inner surface. The second annular grooves are each positioned proximate to a respective one of the first annular grooves and are axially outward from the first annular groove. A scraper seal is seated in each of the second annular grooves. In one embodiment, the scraper seal is stiffer than the first lip seal and the second lip seal.

It is contemplated that one or more of the above-mentioned embodiments may be combined.

DETAILED DESCRIPTION

Figure 1:
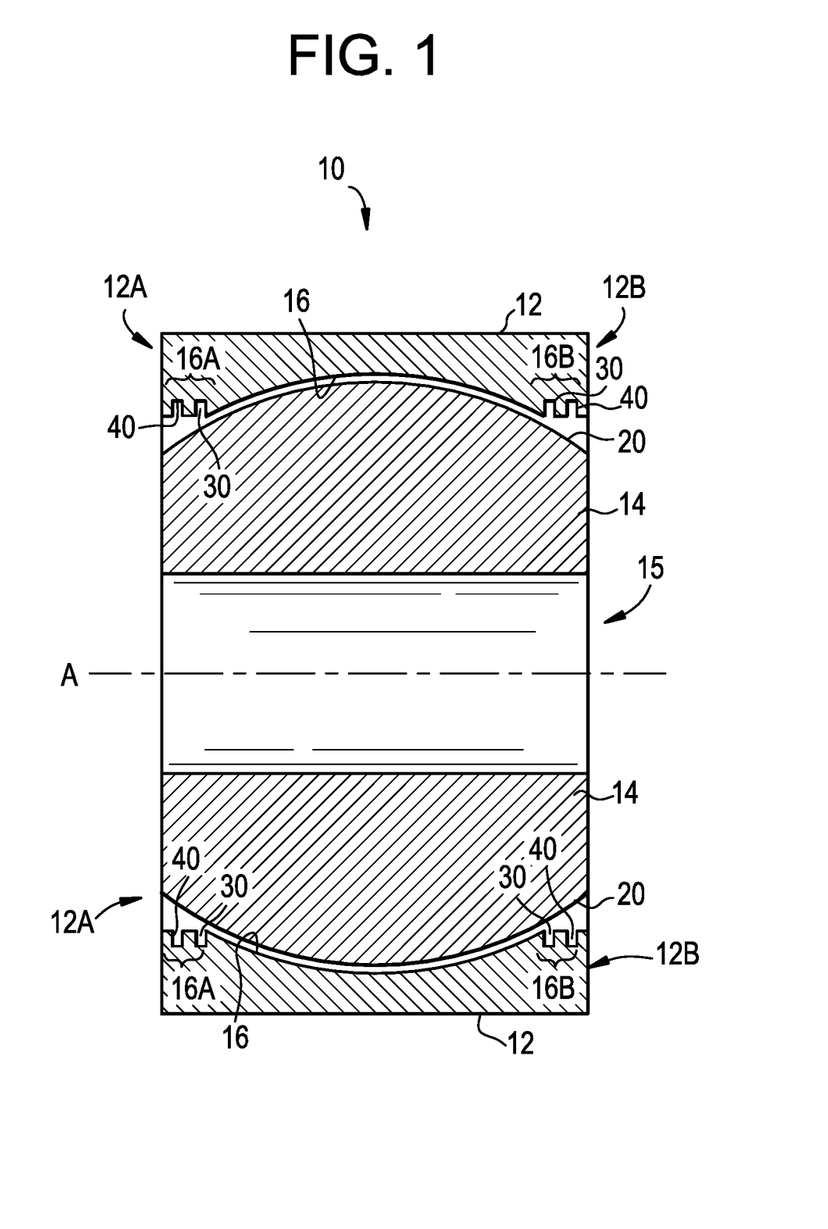
FIG. 1 is a cross sectional view of a bearing assembly having a sealing arrangement that includes grooves that accommodate two different types of seals in accordance with one embodiment of the present invention.

As shown in FIG. 1, a spherical plain bearing is generally designated by the reference number 10 and is hereinafter referred to as the "bearing assembly 10." The bearing assembly 10 includes an outer ring or outer race 12 and an inner member 14 (e.g., a ball) disposed therein. The outer race 12 defines a first end 12A and a second end 12B. The inner member 14 defines a bore 15 extending therethrough, the bore being located substantially concentrically about an axis "A" extending through the bearing assembly 10. The bore 15 is adapted to receive a portion of a shaft or other component therein (not shown). The present invention is not so limited, as the inner member 14 may be integral with or be formed as part of a shaft or other component. Moreover, while the bore 15 is shown and described as extending completely through the inner member 14, the present invention is not limited in this regard as the bore may extend only part-way through the inner member. Although a spherical plain bearing is shown and described, the present invention is not limited in this regard as other types of bearings may be employed, including but not limited to journal bearings and roller bearings.

In the illustrated embodiment, the outer race 12 is a ring that defines an inner engagement surface 16 having a spherically concave contour. The inner engagement surface 16 is contoured to receive a spherically convex contoured outer engagement surface 20 of the inner member 14. The inner engagement surface 16 of the outer race 12 is in sliding disposition to the outer engagement surface 20 of the inner member 14. The inner member 14 and the outer race 12 are rotatable relative to each other. Rotation of the inner member 14 in the outer race 12 may also allow a shaft coupled to or extending through the inner member to be misaligned relative to the axis A. While the outer race 12 has been shown and described as being a ring, the present invention is not limited in this regard as the outer race can assume any practical shape or be part of another component, such as, for example a housing, without departing from the broader aspects of the invention.

In one embodiment as shown in FIG. 1, the inner surface 16 of the outer race 12 terminates proximate to the first and second ends 12A and 12B of the outer race 12. The outer race 12 further defines a first inner surface end 16A proximate to the first end 12A of the outer race 12, and a second inner surface end 16B proximate to the second end 12B of the outer race 12. Each of the first inner surface end 16A and the second inner surface end 16B define a first annular groove 30 and a second annular groove 40. In one embodiment, the first annular groove 30 is substantially concentric with the second annular groove 40. One of the first annular grooves 30 is formed in the first inner surface end 16A, proximate the first end 12A; and another of the first annular grooves 30 is formed in the second inner surface end 16B, proximate the second end 12B. One of the second annular grooves 40 is formed in the first inner surface end 16A, axially outward of the first annular groove 30; and another of the second annular grooves 40 is formed in the second inner surface end 16B, axially outward of the first annular groove 30. In one embodiment, the first annular groove 30 and the second annular groove 40 each define a cross section having a substantially U-shaped geometry.

While the outer race 12 has been shown and described as defining a first annular groove 30 and a second annular groove 40, the present invention is not limited in this regard as the outer race can define less (e.g., one) or more (e.g., three or more) than a first annular groove 30 and a second annular groove 40 without departing from the broader aspects of the invention. While the first annular groove 30 and the second annular groove 40 have been shown and described as defining cross sections having a substantially U-shaped geometry, the present invention is not limited in this regard as the first annular groove 30 and the second annular groove 40 can define respective annular grooves having a variety of geometric configurations, and in particular any geometric configuration corresponding to an annular seal or ring configuration, without departing from the broader aspects of the invention. In addition, the first annular groove 30 and the second annular groove 40 can define respective annular grooves having the different geometric configuration.

Figure 2:
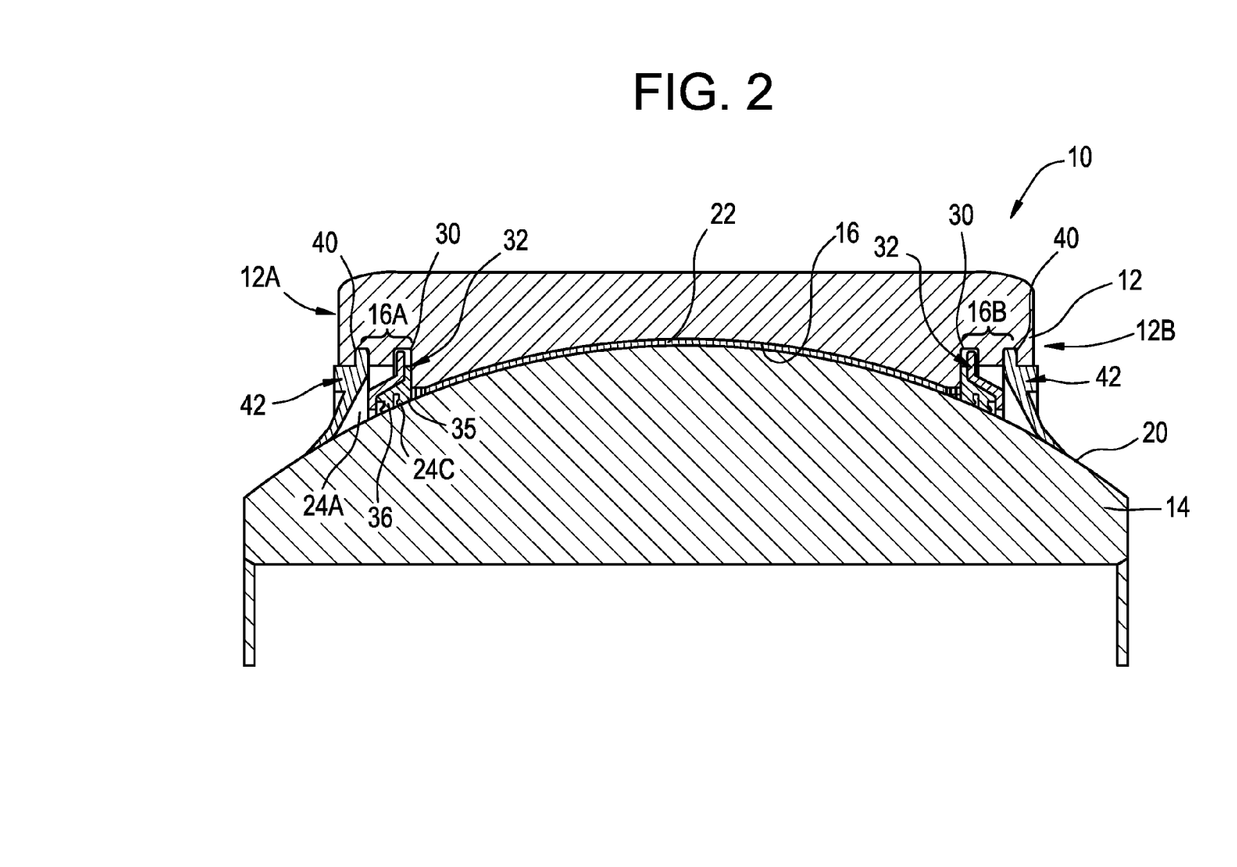
FIG. 2 is cross sectional view of a portion of the bearing assembly shown in FIG. 1 having an internal seal and an external seal disposed on each of opposing axial sides of the bearing assembly.
Figure 3A:
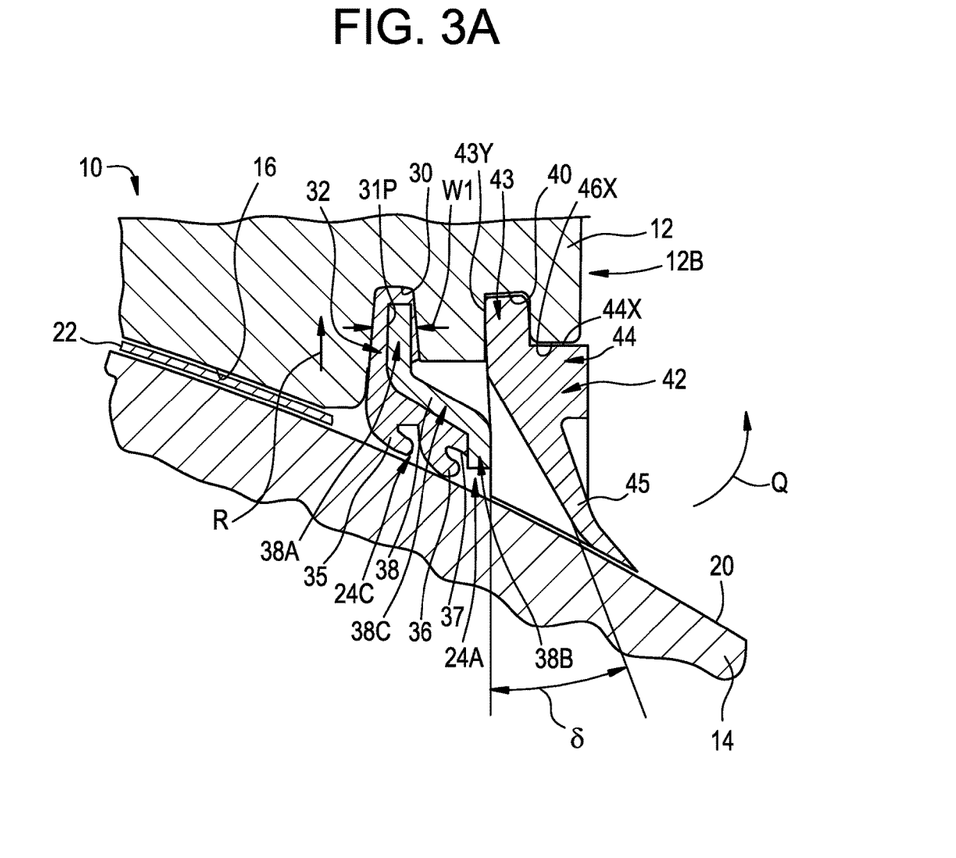
FIG. 3A is an enlarged cross sectional view of a portion of the bearing assembly shown in FIG. 2.
Figure 4A:
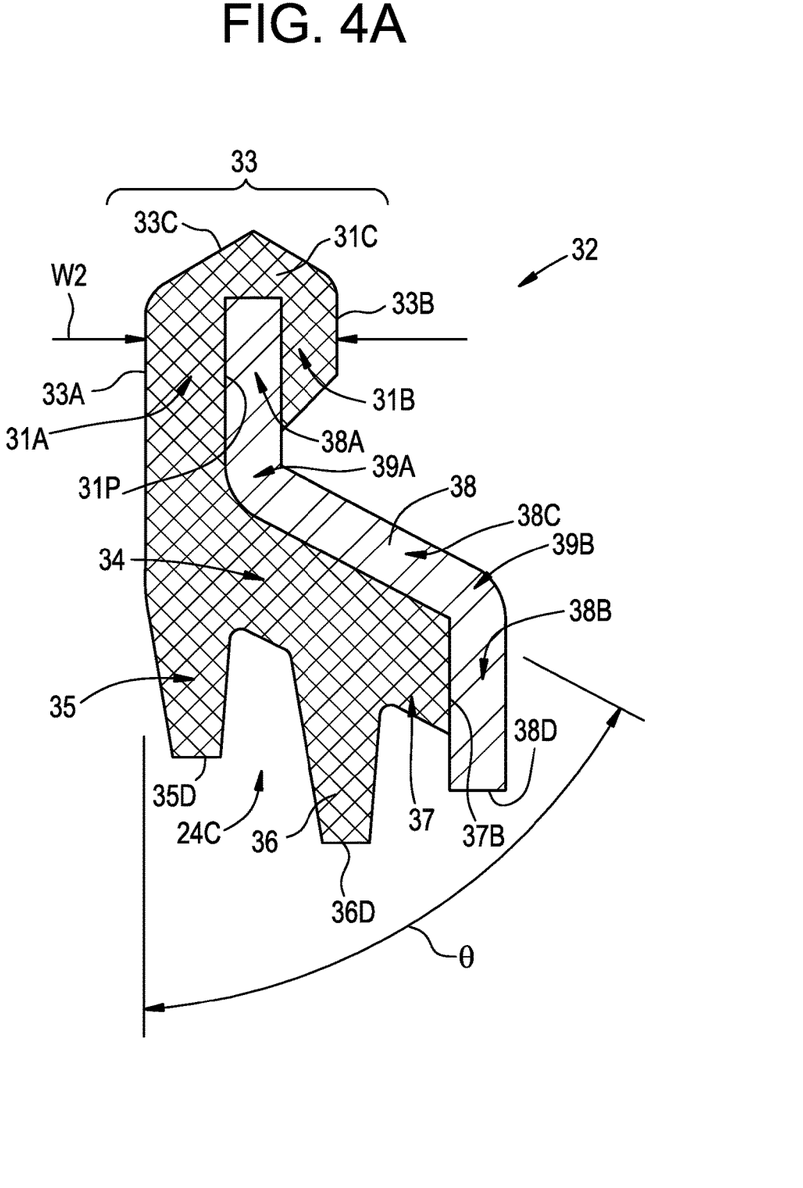
FIG. 4A is an enlarged view of the internal seal of FIGS. 2 and 3.

As shown in FIGS. 2, 3A and 4A, the bearing assembly 10 includes a two stage seal assembly positioned on each of the first inner surface end 16A and the second inner surface end 16B. In particular, the first annular groove 30 of the first inner surface end 16A has a flexible double lipped annular seal 32 seated therein and the second annular groove 40 of the first inner surface end 16A has a scraper seal 42 seated therein; and the first annular groove 30 of the second inner surface end 16B has one of the flexible double lipped annular seals 32 seated therein and the second annular groove 40 of the second inner surface end 16B has one of the scraper seals 42 seated therein. The scraper seals 42 and the flexible double lipped annular seals 32 each extend between the outer race 12 and the inner member 14. The scraper seals 42 (e.g., external seals) are seated axially outward from the respective one of the flexible double lipped annular seals 32 (e.g., internal seals). The scraper seals 42 are more rigid, stiffer and harder than a first base 31C, a branch segment 34, a first lip seal 35 and a second lip seal 36 portions of the flexible double lipped annular seals 32, as described herein. In one embodiment, the first base 31C, the branch segment 34, the first lip seal 35 and the second lip seal 36 portions of the flexible double lipped annular seal 32 are manufactured from natural rubber, synthetic rubber, soft plastic, felt, PTFE, silicones, or other synthetic elastomer materials such as, for example, nitrile, urethane, polyurethane, and the like. The scraper seals 42 are manufactured from a metallic material, plastic such as a thermoplastic material, or a higher durometer elastomer.

The inventors have surprisingly discovered through testing, analysis and experimentation that use of the thermoplastic scraper seals 42 in a axially outward position relative to the flexible double lipped annular seals 32 allows the scraper seals 42 to slightly flex to conform to the contour of the outer engagement surface 20 of the inner member 14 yet maintain sufficient rigidity to dislodge and scrape off large and hard particles from the outer engagement surface 20 of the inner member 14 when the inner member is misaligned relative to the outer race 12. This also allows the flexible double lipped annular seals 32 to conform (e.g., elastically deform) to the contour of the outer engagement surface 20 of the inner member 14 to prevent the ingress of liquids and small particles into a space between the inner member 14 and the outer race 12.

Referring to FIGS. 2, 3A, 4A and 4B, the bearing assembly 10 includes the inner member 14 having the outer engagement surface 20 and the outer race 12 having the inner engagement surface 16. The inner engagement surface 16 is positioned on the outer engagement surface 20 of the inner member 14 and contoured to a shape complementary to the outer engagement surface 20 such that the outer engagement surface 20 is slidably and rotatably engaged with the inner engagement surface 16. The bearing assembly 10 includes the first annular groove 30 formed in the inner surface end 16A proximate the first end 12A and another of the first annular grooves 30 formed in the second inner surface end 16A of the second end 12B. A flexible double lipped annular seal 32 is seated in each of the first annular grooves 30.

As best shown in FIG. 4A, the flexible double lipped annular seal 32 includes a first anchor segment 33 that has the axially extending first base 31C that defines a radially outermost portion of the first anchor segment 33. The flexible double lipped annular seal 32 includes a first leg 31A extending radially inward from the first base 31C and a second leg 31B extending radially inward from the first base 31C. The first leg 31A and the second leg 31B define a pocket 31P therebetween. The flexible double lipped annular seal 32 includes the branch segment 34 extending axially outward and radially inward from the first leg 31A at a first angle θ (e.g., 45 to 75 degrees) relative to a first axial surface 33A of the first leg 31A. The first lip seal 35 extends radially inward from the branch segment 34; and the second lip seal 36 extends radially inward from the branch segment 34. The first lip seal 35 and the second lip seal 36 have a gap 24C therebetween. The first lip seal 35 terminates in a distal end 35D and the second lip seal 36 terminates in a distal end 36D. The branch segment 34 terminates in a stub segment 37. In one embodiment, the gap 24C is filled with a lubricant (e.g., grease) and/or a sealant material.

As best shown in FIG. 4A, the flexible double lipped annular seal 32 includes a metallic shield 38 having a radially extending second base 38A and a mid-section 38C extending axially outward and radially inward from the second base 38A at the first angle θ at a first bend 39A.

The metallic shield 38 has a terminus segment 38B extending radially inward from the mid-section 38C at a second bend 39B. The terminus segment 38B terminates at a radial end 38D. The second base 38A and the terminus segment 38B are parallel to one another and to the first axial surface 33A of the first leg 31A. The metallic shield 38 provides a stiffening feature to the flexible double lipped annular seal 32 to assist in securing the flexible double lipped annular seal 32 in the first annular groove 30 by providing a radially outward acting biasing force that urges the first anchor segment 33 of the flexible double lipped annular seal 32 into the first annular groove 30. In addition, the metallic shield 38 protects the branch segment 34, the first lip seal 35 and the second lip seal 36 from projectiles and obstructions that could otherwise impinge on and damage them. The metallic shield 38 is particularly beneficial for protecting the branch segment 34, the first lip seal 35 and the second lip seal 36 from projectiles and obstructions in the bearing assemblies 110 configuration of FIG. 4B in which no scraper seal 42 is utilized.

As shown in FIGS. 3 and 4A, the second base 38A of the metallic shield 38 is seated (e.g., embedded in and/or adhered to) in the pocket 31P. For example, the first leg 33A and the second leg 33B of the first anchor segment 33 are compressed axially toward one another as a result of having a width W2 that is greater than a width W1 of the first annular groove 30. Thus the first axial surface 33A of the first leg 31A and a second opposite axially facing surface 33B frictionally engage opposing walls of the first annular groove 30. In addition, the flexible double lipped annular seal 32 has a first diameter at a radially outermost portion of the first base 31C that is greater than an inside diameter of the first annular groove 30. Thus, the first base 31C is radially compressed (e.g., in the direction of the arrow R) in the first annular groove 30 so that a radially outermost surface 33C of the first base 31C frictionally engages a bottom portion (i.e., radially outermost portion) of the first annular groove 30. The mid-section 38C is adhered to (e.g., via an adhesive such as an epoxy) the branch segment 34 and a portion of the terminus segment 38B is adhered to the stub segment.

As shown in FIGS. 3 and 4A, the stub segment 37 is spaced apart from the second lip seal 36 and includes an end face 37B. The terminus segment 38B has a radial end 38D that is positioned radially outward from the distal end 36D of the second lip seal 36 and extends radially inward from the stub segment 37.

Figure 5:
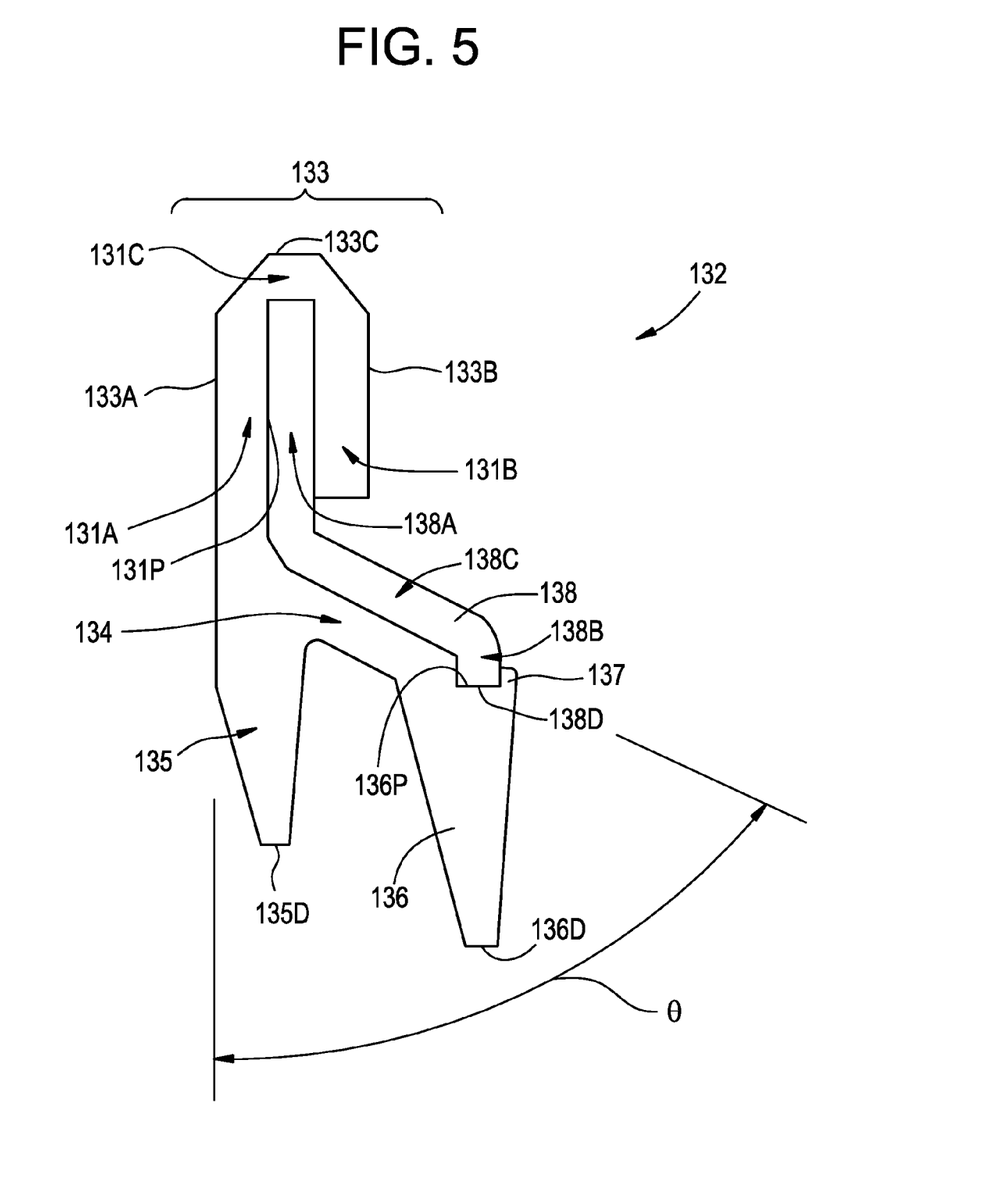
FIG. 5 is an enlarged view of another embodiment of the internal seal of FIGS. 2 and 3.
Figure 6A:
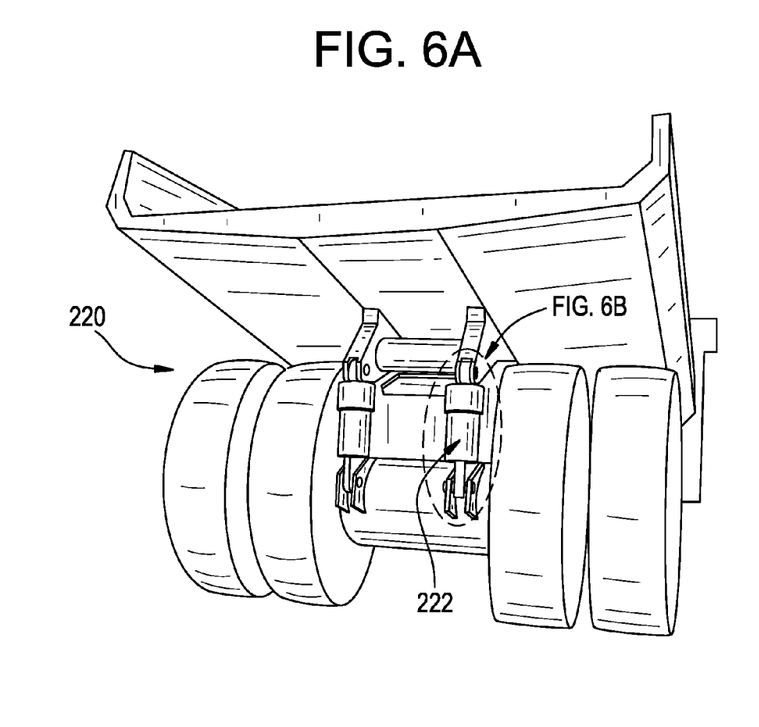
FIG. 6A is a perspective view of a rear portion of a heavy haul truck.
Figure 6B:
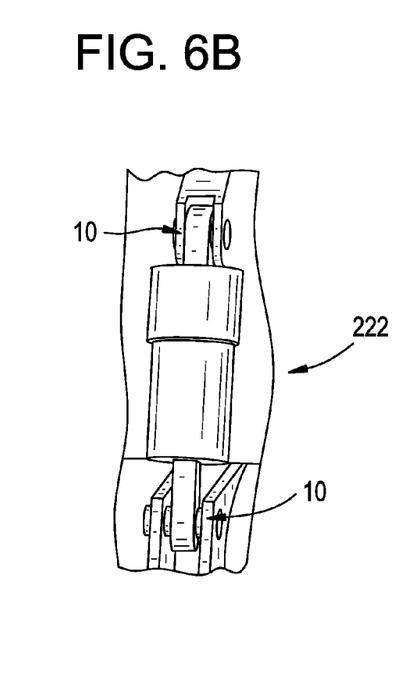
FIG. 6B is an enlarged view of a strut detail 6B of the heavy haul truck of FIG. 6A.
Figure 7:
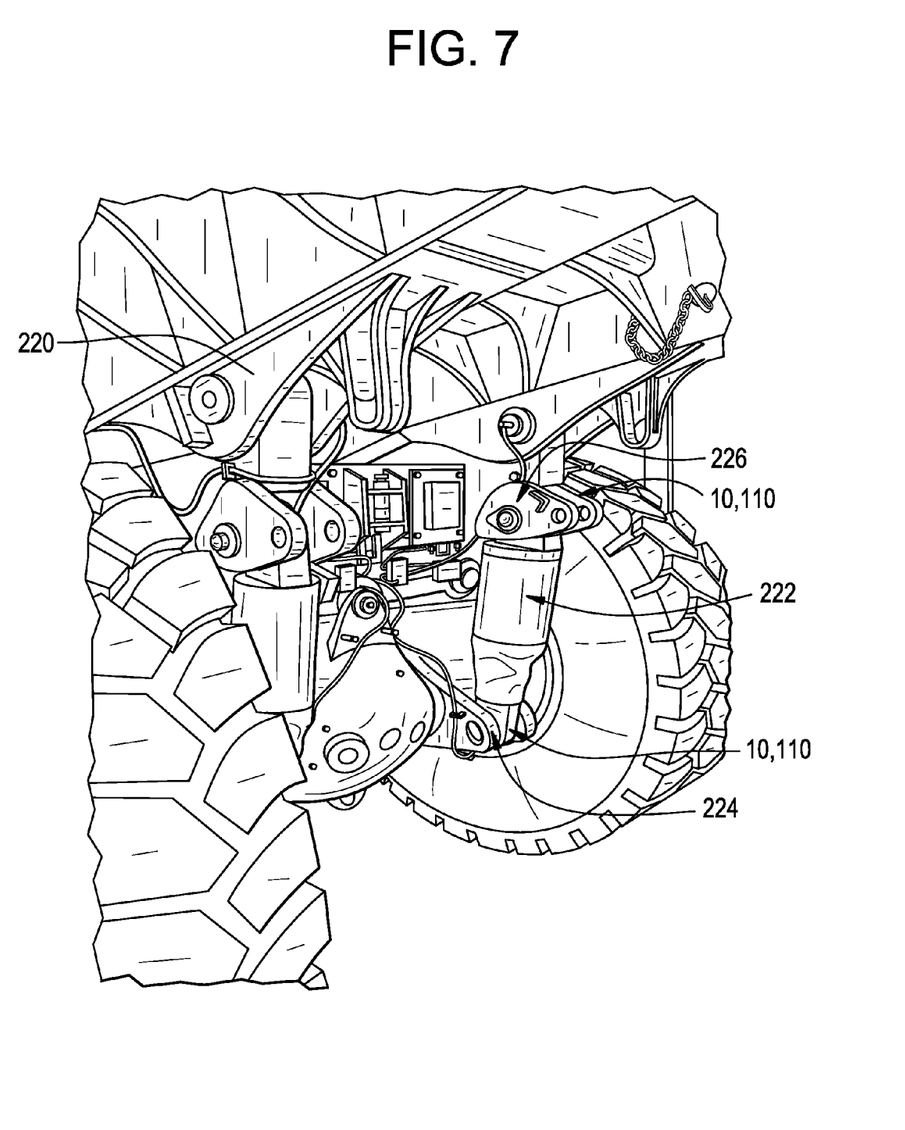
FIG. 7 is perspective view of a rear portion of a heavy haul truck illustrating rear struts.
Figure 8:
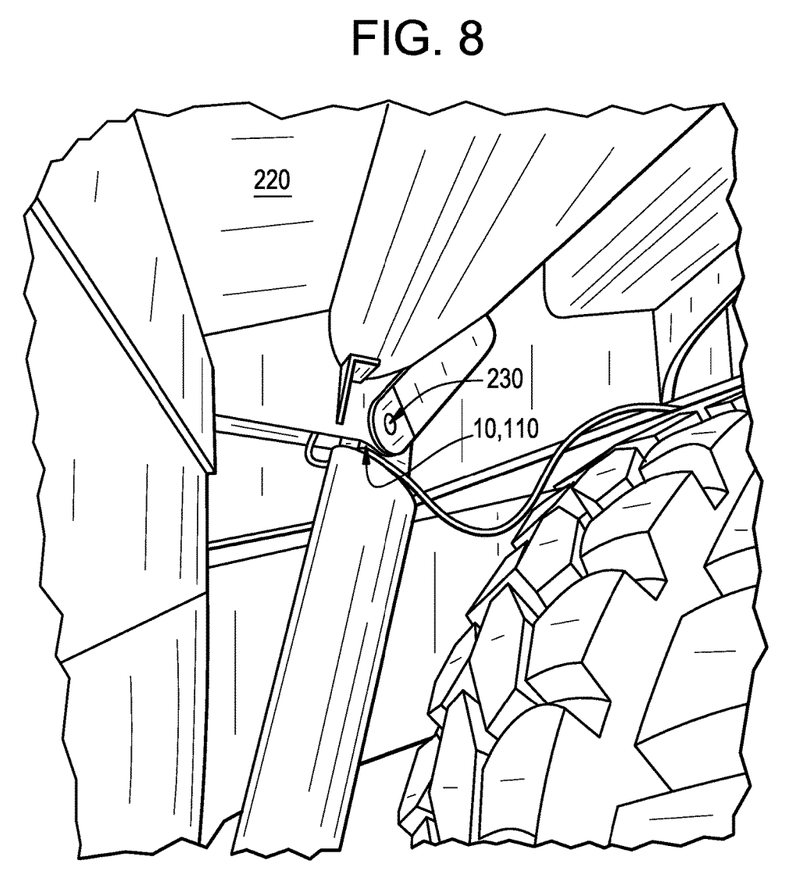
FIG. 8 is perspective view of a hoist cylinder portion of a heavy haul truck illustrating a hoist cylinder having a spherical bearing installed therein.
Figure 9:
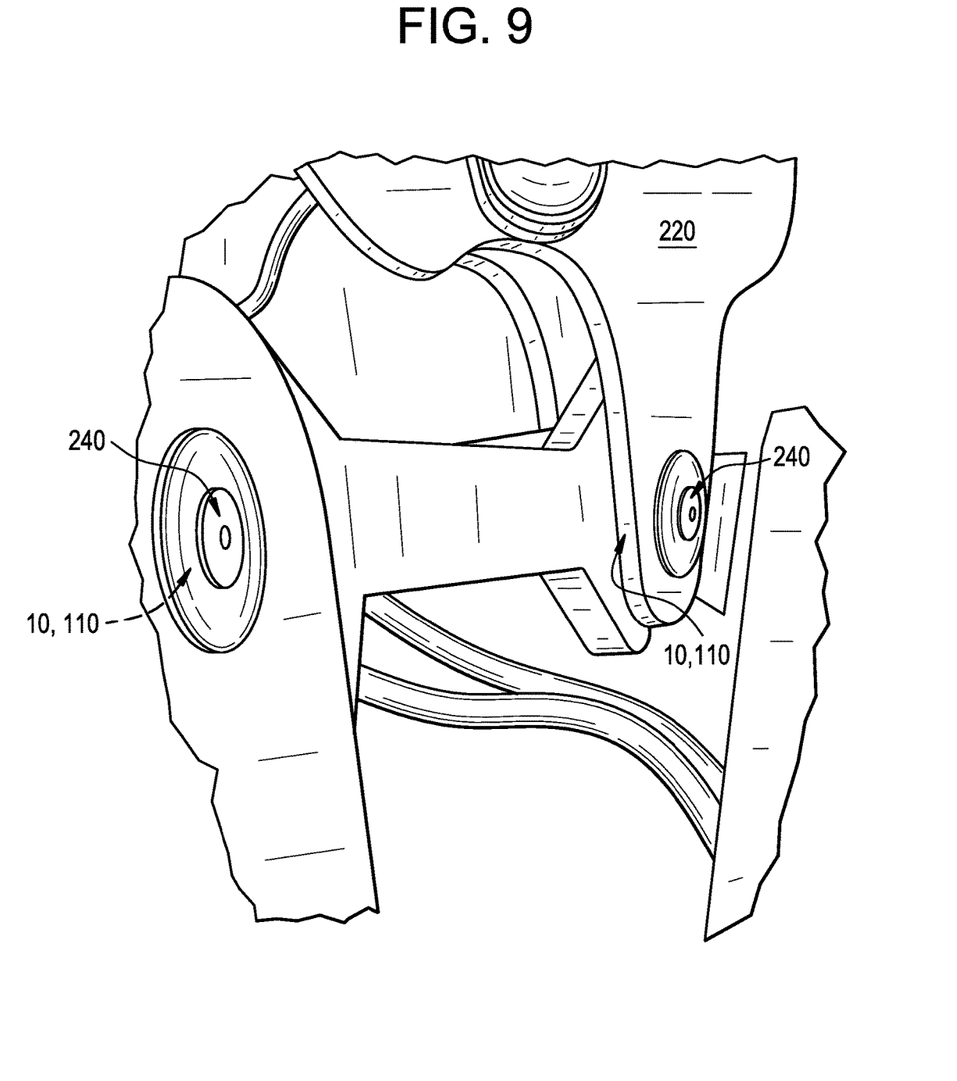
FIG. 9 is perspective view of a panhard link portion of a heavy haul truck illustrating spherical bearings.

As shown in FIG. 5, the flexible double lipped annular seal 132 is similar to the flexible double lipped annular seal 32 of FIG. 3, therefore similar elements are designated with similar reference characters preceded by the number 1. The stub segment 137 shown in FIG. 5 is spaced apart from the branch segment 134 and defines a radially inward extending channel 136P. A distal end 138D of the terminus segment 138B is seated in the channel 136P.

As shown in FIGS. 1, 2 and 3, the bearing assembly 10 further includes a second annular groove 40 formed in the first inner surface end 16A; and another of the second annular grooves 40 is formed in the second inner surface end 16B. The second annular grooves 40 are positioned axially outward from the respective first annular groove 30.

Figure 4B:
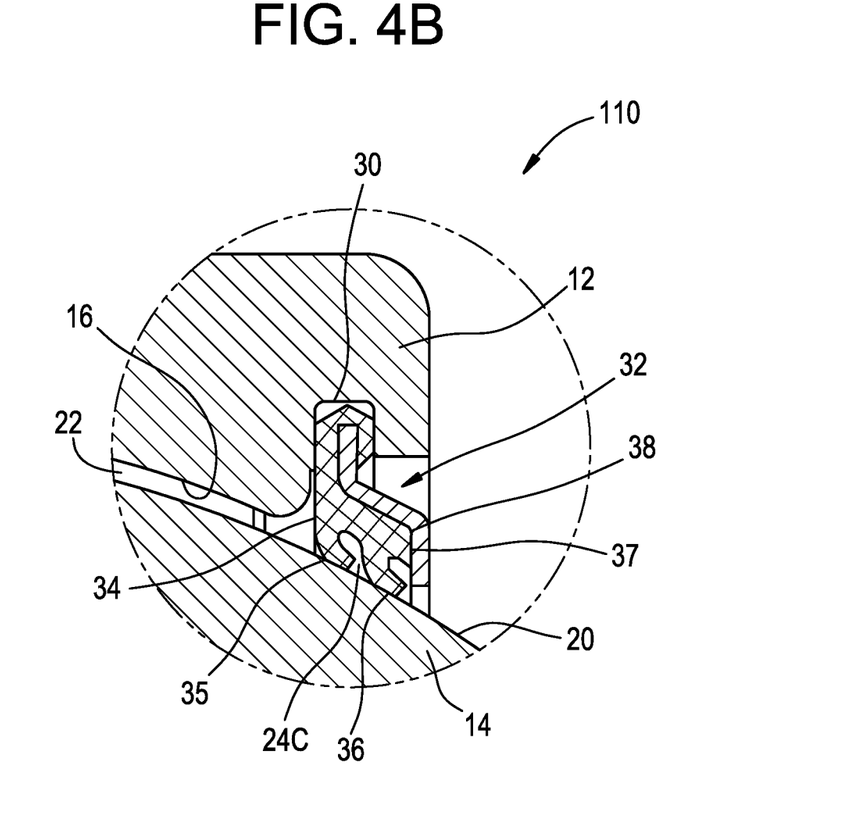
FIG. 4B is an enlarged view of a portion of another embodiment of a bearing assembly having only one seal on an axial end thereof.

As shown in FIGS. 2 and 3 a second gap 24A is located between the flexible double lipped annular seal 32 and the scraper seal 42. In one embodiment, the second gap 24A is filled with a lubricant and/or a sealant material. While FIGS. 2 and 3 show both the first annular groove 30 and the second annular groove 40; and the flexible double lipped annular seal 32 as well as the scraper seal 42, the present invention is not limited in this regard as the bearing assembly 10 may only employ the first annular grooves 30 with the flexible double lipped annular seals 32, as illustrated in FIG. 4B.

As shown in FIGS. 2 and 3, a scraper seal 42 is seated in each of the second annular grooves 40. In one embodiment, the scraper seal 42 comprises a thermoplastic material. In one embodiment, the scraper seal 42 is stiffer than the first lip seal 35 and the second lip seal 36.

As best shown in FIG. 3, the scraper seal 42 includes a second anchor segment 43 that has a shape complementary to the second annular groove 40. A stabilizing block 44 extends axially away from the second anchor segment 43 and is arranged to form a shoulder 44X with the second anchor segment 43. The shoulder 44X seats on a radially inward facing abutment surface 46X of the outer race 12 to resist rotation of a seal leg 45 in the direction of the arrow Q. The seal leg 45 extends at a second angle δ (e.g., 20 to 40 degrees) relative to an axial face 43Y of the scraper seal 42.

Referring back to FIGS. 2 and 3, in one embodiment, the bearing assembly 10 includes a self-lubricating coating composition applied to the contoured surface of the inner member 14 to form a lubricious liner 22. The lubricious liner 22 is disposed between the outer engagement surface 20 of the inner member 14 and the inner engagement surface 16 of the outer race 12. The present invention is not limited in this regard, however, as the lubricious liner 22 is optional. In embodiments employing the lubricious liner 22, the coating composition forming the lubricious liner 22 may be applied to one or more of the spherically convex contoured outer engagement surface 20 of the inner member 14 and the inner surface 16 of the outer race 12. In embodiments of the bearing assembly 10 in which the lubricious liner 22 is present, one or more of the spherically convex contoured outer engagement surface 20 of the inner member 14 and the inner surface 16 of the outer race 12 are generally treated to achieve a desired surface finish (e.g., via a grit-blasting operation). The surfaces are then cleaned and dried, and the coating composition is applied by a method such as, for example, spraying, spinning, dipping, injection, bonding, or the like. Once the self-lubricating coating composition is applied, the composition may be cured by any suitable method and subsequently machined to particularly desired measurements to form the lubricious liner 22.

Figure 3B:
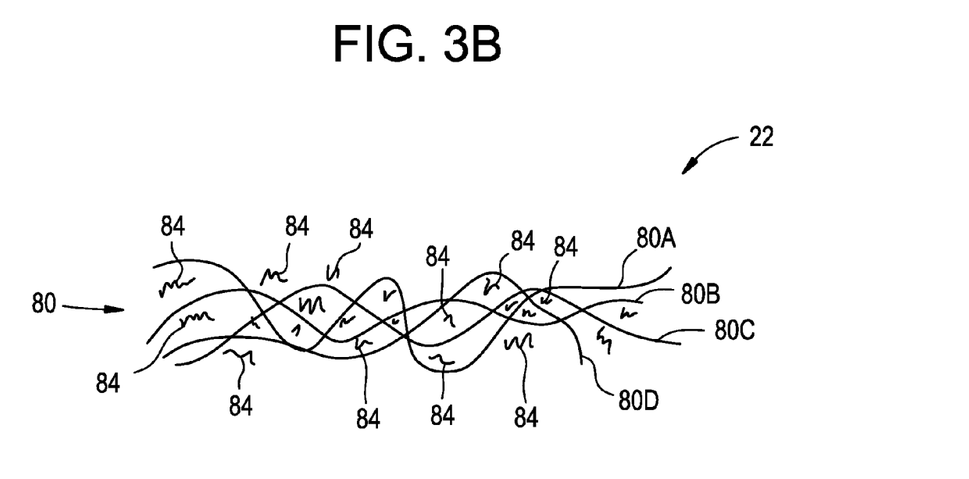
FIG. 3B is a schematic drawing of an enlarged cross section of the lubricious liner of the bearing assembly.

In one embodiment, as shown for example in FIG. 3B, the lubricious liner 22 is a woven fabric 80. The woven fabric 80 includes a plurality of fibers 80A, 80B, 80C, and 80D interwoven with one another and polytetrafluoroethylene (PTFE) 84 interwoven therewith. The fibers 80A, 80B, 80C, and 80D include, for example, a polyester material, a stainless steel material and/or glass material. The fibers 80A, 80B, 80C, and 80D interwoven with the PTFE enhance bondability of lubricous liner 22 to the surface(s) it is applied to. In one example, the lubricious liner 22 is Lubron® TF woven PTFE fabric liner, which is commercially available from Roller Bearing Company of America®, Oxford, Conn., United States. Other examples of lubricious liner 22 include Uniflon® liner systems and Fibriloid® liner systems commercially available from Roller Bearing Company of America®, Oxford, Conn., United States. The lubricious liner 22 has properties and characteristics sufficient to withstand high loads with insignificant wear. It should understood that the specific examples provided above are for illustration purposes only and are not intended to limit the present invention to any specific brand or type of lubricious liner.

The inner member 14 may be made from a steel or other metallic based alloy including, but not limited to, aluminum, titanium, nickel, copper, cobalt, and the like. For example, the inner member 14 may be made from AISI 52100, AISI 440C, 4340 or 4130 alloy steel, 17-4PH, 15-5PH, or 13PH-8MO. It is also contemplated that the inner member 14 may be made from other materials that are sufficiently hard or can be sufficiently hardened through heat treatment or surface treatment. The inner member 14 made from any of the foregoing materials may be chrome plated.

The outer race 12 may be made from steel or an alloy steel, including, but not limited to, 4340, 4130, 17-4PH, 15-5PH, or 13PH-8MO, or another suitable material. It is also contemplated that the outer race 12 may be made of a material that provides for a sufficient mating surface for either a self-lubricating coating composition on the contoured surface of the inner member 14, or for a greased metal-on-metal bearing. The outer race 12 and the inner member 14 may be made of the same or different materials.

Referring to FIGS. 6A, 6B and 7-9, the bearing assemblies 10 and 110 may be utilized in a variety of situations and applications, including, but not limited to, vehicle suspension systems (e.g., FIGS. 6A, 6B and 7, see strut 222 and with the bearing assemblies 10, 110 positioned in pivot connections 224 and 226) and steering systems for heavy haul trucks 220. In one embodiment, the bearing assemblies 10 and 110 may be utilized in a suspension system and/or a steering system of mining and construction vehicles 220 for pivotally or rotationally connecting structural components to the vehicle such as, for example, struts or other telescopic dampers, hydraulic cylinders (e.g., FIG. 8 see upper hoist cylinder with a bearing 10, 110 located in at pivot connection 230) or other mechanical and pneumatic actuators, a panhard link (e.g., FIG. 9, see panhard link with bearings 10, 110 located in pivot connections 240) or other link of a multi-link suspension system, and the like. The use of the bearing assemblies 10 and 110 is not limited in this regard as it is contemplated to use such bearing assemblies in other applications, such as, for example, military vehicles including a tank or transport vehicle, and other heavy duty equipment, such as, for example, heavy duty pick-up trucks, dump trucks, fire trucks, and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the foregoing description.

What is claimed is:

1. A bearing assembly, comprising:
an inner member having an outer engagement surface extending between a first end and second end of the inner member;
an outer race having an inner engagement surface, the inner engagement surface being positioned on the outer engagement surface of the inner member and contoured to a shape complementary to the outer engagement surface such that the outer engagement surface is slidably and rotatably engaged with the inner engagement surface;
at least one first annular groove formed in the inner engagement surface, proximate at least one of the first end and the second end;
a flexible double lipped annular seal comprising:
a first anchor segment comprising an axially extending first base defining a radially outermost portion of the first anchor segment, a first leg extending radially inward from the first base and a second leg extending radially inward from the first base, the first leg and the second leg defining a pocket therebetween;
a branch segment extending axially outward and radially inward from the first leg at a first angle relative to a first axial surface of the first leg, a first lip seal extending radially inward from the branch segment and a second lip seal extending radially inward from the branch segment, the first lip seal and the second lip seal having a gap therebetween, the branch segment terminating in a stub segment;
a metallic shield having a radially extending second base and a mid-section extending axially outward and radially inward from the second base at the first angle and a terminus segment extending radially inward from the mid-section; and
the second base of the metallic shield being seated in the pocket, the mid-section being adhered to the branch segment and a portion of the terminus segment being adhered to the stub segment,
at least one second annular groove formed in the inner engagement surface and being positioned axially outward from the first annular groove; and
a scraper seal being seated in the at least one second annular groove, wherein the scraper seal is stiffer than the first lip seal and the second lip seal, the scraper seal configured to flex to conform to a contour of the outer engagement surface to dislodge and remove particles from the outer engagement surface when the inner member is misaligned relative to the outer race.

2. The bearing assembly of claim 1, wherein the stub segment is spaced apart from the second lip seal and the terminus segment has a radial end that is positioned radially outward from a distal end of the second lip seal and extends radially inward from the stub segment.

3. The bearing assembly of claim 1, wherein the stub segment is spaced apart from the branch segment and defines a radially inward extending channel and a distal end of the terminus segment is seated in the channel.

4. The bearing assembly of claim 1, further comprising a second gap located between the flexible double lipped annular seal and the scraper seal, the second gap being filled a with at least one of a lubricant and a sealant material.

5. The bearing assembly of claim 1, wherein the first gap is filled with at least one of a lubricant and a sealant material.

6. The bearing assembly of claim 1, further comprising a lubricious liner disposed between the outer engagement surface of the inner member and the inner engagement surface of the outer race.

7. The bearing assembly of claim 1, wherein the scraper seal comprises a thermoplastic material.

8. The bearing assembly of claim 1, wherein the scraper seal comprises a second anchor segment that has a shape complementary to the at least one second annular groove and has a stabilizing block extending axially away from the second anchor segment and arranged to form a shoulder with the second anchor segment, and the shoulder seating on an radially inward facing abutment surface of the outer race.

9. The bearing assembly of claim 8, further comprising a seal leg extending at a second angle relative to an axial face of the scraper seal.

10. The bearing assembly of claim 1, wherein:
(a) the first base, the branch segment, the first lip seal and the second lip seal are each manufactured from natural rubber, synthetic rubber, felt, PTFE, silicones or a synthetic elastomer polymer; and
(b) the scraper seal is manufactured from a metallic material or a thermoplastic material.

* * * * *